(12) United States Patent
Furusawa et al.

(10) Patent No.: US 11,099,383 B2
(45) Date of Patent: Aug. 24, 2021

(54) HEAD-UP DISPLAY DEVICE

(71) Applicant: NIPPON SEIKI CO., LTD., Niigata (JP)

(72) Inventors: Hiroyuki Furusawa, Niigata (JP); Shota Koike, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 87 days.

(21) Appl. No.: 16/071,452

(22) PCT Filed: Jan. 16, 2017

(86) PCT No.: PCT/JP2017/001168
§ 371 (c)(1),
(2) Date: Jul. 19, 2018

(87) PCT Pub. No.: WO2017/126457
PCT Pub. Date: Jul. 27, 2017

(65) Prior Publication Data
US 2019/0025579 A1    Jan. 24, 2019

(30) Foreign Application Priority Data

Jan. 21, 2016 (JP) .............................. JP2016-010159

(51) Int. Cl.
*G02B 27/01* (2006.01)
*B60K 35/00* (2006.01)
*B60R 1/00* (2006.01)

(52) U.S. Cl.
CPC .......... *G02B 27/0101* (2013.01); *B60K 35/00* (2013.01); *B60R 1/00* (2013.01);
(Continued)

(58) Field of Classification Search
CPC ........ G02B 27/0101; G02B 2027/0118; B60K 35/00; B60K 2370/1529; B60K 2370/336;
(Continued)

(56) References Cited

U.S. PATENT DOCUMENTS

| 5,760,931 A | 6/1998 | Saburi et al. |
| 5,949,346 A * | 9/1999 | Suzuki ................... B60K 37/02 340/815.45 |
| 2013/0135748 A1* | 5/2013 | Sato ................... G02B 27/0101 359/630 |

FOREIGN PATENT DOCUMENTS

| JP | H04-090934 A | 3/1992 |
| JP | H11-278100 A | 10/1999 |

(Continued)

OTHER PUBLICATIONS

Search Report issued in corresponding International Patent Application No. PCT/JP2017/001168, dated Mar. 21, 2017.

*Primary Examiner* — Marin Pichler
*Assistant Examiner* — Mitchell T Oestreich
(74) *Attorney, Agent, or Firm* — McDermott Will & Emery LLP

(57) ABSTRACT

The present invention provides a head-up display device wherein a light shielding part for preventing a washout phenomenon is prevented from shining. A head-up display according to the present invention, in which a display unit for emitting display light (L) is housed in a case and the upper portion of the display unit is covered by the light shielding part, has strip-shaped protrusion parts formed on the bottom surface of the light shielding part (42). With this constitution, the strip-shaped protrusion parts prevent the scattered light (SL) resulting from the light (L) output from the display unit from illuminating the bottom surface of the (Continued)

anti-washout light shielding part, thereby preventing the bottom surface from being displayed as a virtual image.

6 Claims, 3 Drawing Sheets

(52) U.S. Cl.
CPC ..... *B60K 2370/1529* (2019.05); *B60K 2370/334* (2019.05); *B60K 2370/336* (2019.05); *B60R 2300/205* (2013.01); *G02B 2027/0118* (2013.01)

(58) Field of Classification Search
CPC ................ B60K 2370/334; B60R 1/00; B60R 2300/205
USPC .......................................................... 359/630
See application file for complete search history.

(56) References Cited

FOREIGN PATENT DOCUMENTS

| JP | 2005-289098 A | 10/2005 |
|----|---------------|---------|
| JP | 2012-058690 A | 3/2012 |
| JP | 2016-000591 A | 1/2016 |
| WO | 94/14098 A1 | 6/1994 |

\* cited by examiner

HEAD-UP DISPLAY DEVICE

CROSS REFERENCE

This application is the U.S. National Phase under 35 U.S.C. § 371 of International Application No. PCT/JP2017/001168, filed on Jan. 16, 2017, which claims the benefit of Japanese Application No. 2016-010159, filed on Jan. 21, 2016, the entire contents of each are hereby incorporated by reference.

TECHNICAL FIELD

The present invention relates to a head-up display device including a light shielding part for preventing a washout phenomenon.

BACKGROUND ART

Patent Literature 1 describes a conventional head-up display device. The head-up display device includes a light shielding part for preventing a phenomenon (washout phenomenon) in which a virtual image cannot be clearly seen as a result of sunlight (external light) entering a display (display unit) that emits display light.

CITATION LIST

Patent Literature

Patent Literature 1: Japanese Unexamined Patent Application Publication No. H11-278100

SUMMARY OF THE INVENTION

Problems to be Solved by the Invention

However, a bottom surface of the light shielding part for preventing a washout phenomenon is illuminated with scattered light of display light emitted from the display unit, and the shining light shielding part is displayed as a virtual image. This may impair a marketability of the head-up display device.

The present invention has been achieved in view of the above problem, and an object thereof is to provide a head-up display device that prevents a light shielding part for preventing a washout phenomenon from shinning.

Means for Solving the Problems

A head-up display device according to the present invention is a head-up display device including: a display unit for emitting display light, which is housed in a case; and a light shielding part that blocks a part of an opening part from which the display light is emitted, wherein a bottom surface of the light shielding part is formed with a strip-shaped protrusion part.

Further, it is preferable to configure so that the strip-shaped protrusion part of the head-up display device according to the present invention has a flat surface formed continuously with a top surface of the light shielding part.

Further, it is preferable that the strip-shaped protrusion part of the head-up display device according to the present invention is formed in plural, and the plurality of strip-shaped protrusion parts are configured to be formed to increase in size as the plurality of strip-shaped protrusion parts are farther away from the display unit.

Effect of the Invention

According to the present invention, it is possible to provide a head-up display device that prevents an anti-washout light shielding part from shining.

MODE FOR CARRYING OUT THE INVENTION

Figure 1:
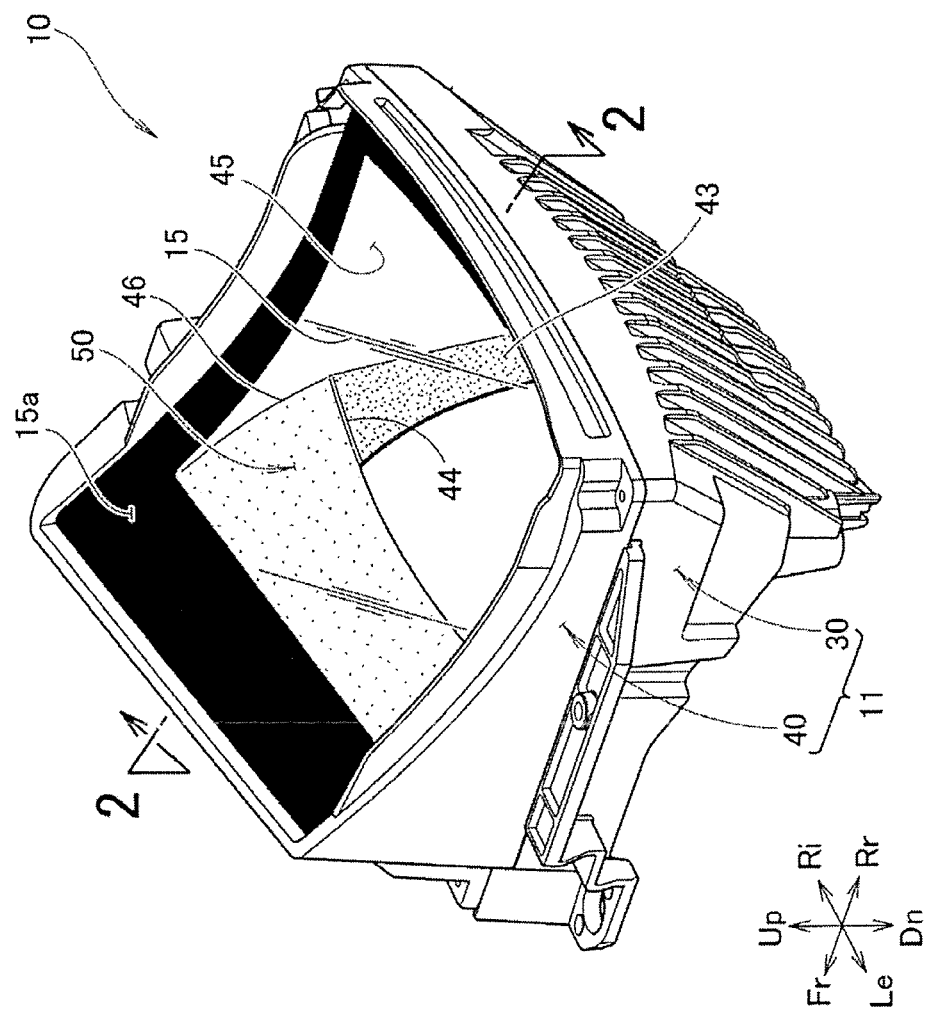
FIG. 1 is a perspective view of a head-up display device 10 which is an embodiment of the present invention.
Figure 2:
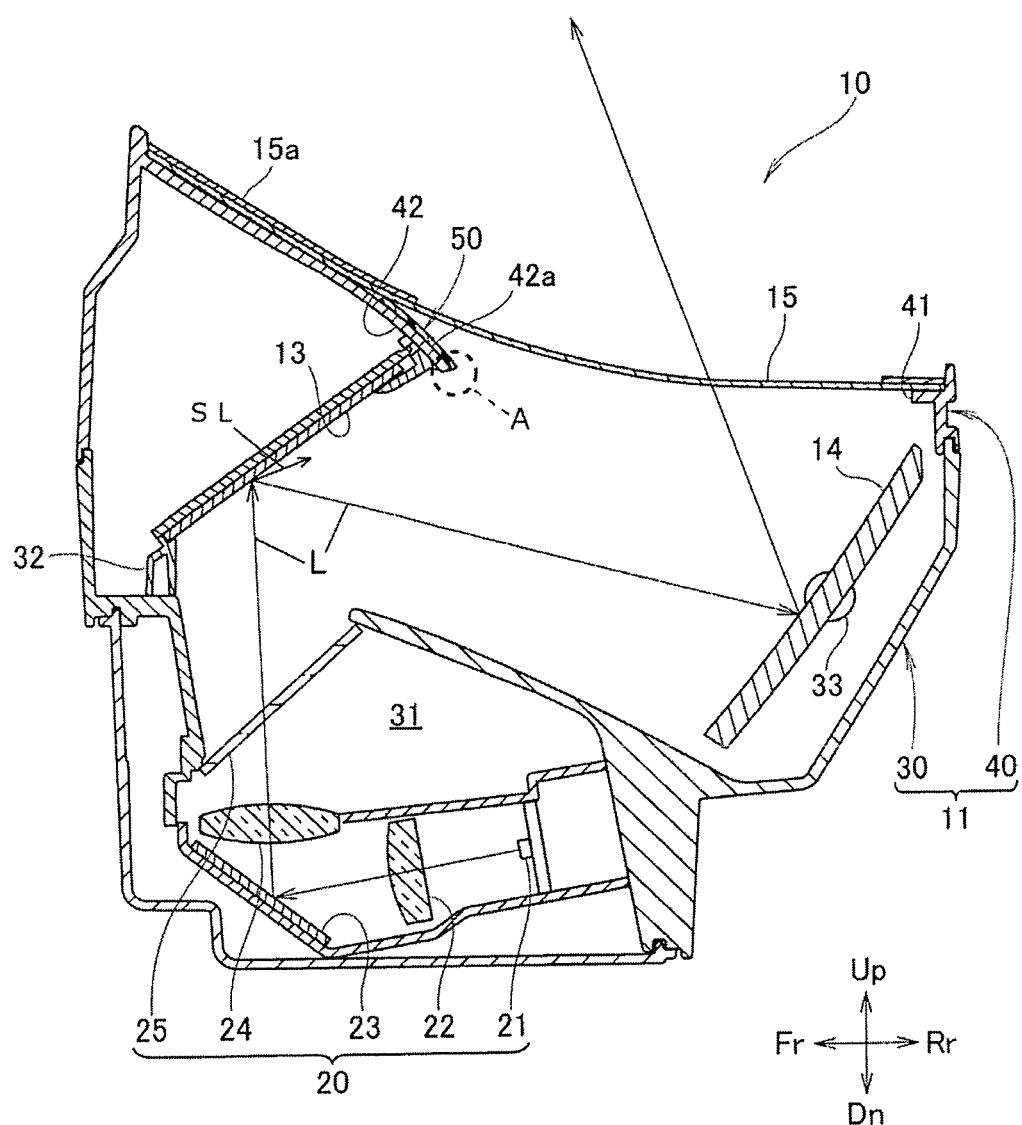
FIG. 2 is a cross-sectional view of the head-up display device 10 taken along line 2-2.

An embodiment of the present invention will be described based on the attached drawings, below. In the description, when left and right are mentioned, an occupant of a vehicle is used as a reference, and front and rear are mentioned, a traveling direction of the vehicle is used as a reference. Further, in the drawings, Fr denotes the front of the vehicle, Rr denotes the back of the vehicle, Le denotes left as viewed from the occupant, Ri denotes right as viewed from the occupant, Up denotes upward as viewed from the occupant, and Dn denotes downward as viewed from the occupant.

A head-up display device 10 which is an embodiment of the present invention is mounted on a vehicle, and displays a virtual image on a front windshield (windshield glass) of the vehicle. The occupant can view the virtual image at the front of the front windshield to view vehicle information (for example, a running speed and an engine speed of the vehicle) represented by the virtual image while viewing a scene at the front.

Inside a case 11 of the head-up display device 10, a display unit 20 that emits display light L representing the vehicle information is housed. Further, inside the case 11, a plane mirror 13 and a concave mirror 14 that reflect the display light L are mounted. A top of the case 11 is formed with an opening, and the opening is covered with a translucent cover 15 made of a film-like translucent resin.

In the case 11, an upper case 40 is placed over a lower case 30.

The display unit 20 includes a backlight 21 made of LED, a first lens 22 through which light emitted from the backlight 21 passes through, a reflecting mirror 23 that upwardly reflects the light passing through this second lens 22, a second lens 24 through which the light reflected by the reflecting mirror 23 passes through, and a liquid crystal panel 25 of which the rear surface is illuminated with the light passing through the second lens 24 to output the display light L.

The display light L emitted from the liquid crystal panel 25 is reflected by the plane mirror 13 and the concave mirror 14 to be emitted outwardly of the case 11 after passing through the translucent cover 15. The display light L emitted outwardly of the case 11 is projected onto the front windshield of the vehicle so that the virtual image is displayed at the front of the front windshield.

The plane mirror 13 is a reflecting mirror formed with a plane reflecting surface obtained by depositing a metal such as aluminum onto a surface of a resin member such as polycarbonate (PC). The plane mirror 13 reflects the display light L emitted from the display unit 20 toward the concave mirror 14. It is configured so that the display light L is returned inside the case 11 by using the plane mirror 13, such that an optical path of the display light L from the display unit 20 to the front windshield can be made longer. As a result, the virtual image can be displayed at a further frontal area of the front windshield The concave mirror 14 is a reflecting mirror formed with a concave reflecting surface obtained by depositing a metal such as aluminum onto a surface of a resin member such as polycarbonate. The display light L emitted to the concave mirror 14 can be enlarged by the concave mirror 14, and thus, even if the display unit 20 is made of a relatively small and inexpensive component, it is possible to display the large virtual image onto the front windshield. Further, a concave shape of the concave mirror 14 is designed to offset a distortion caused by a curved shape of the front windshield.

The translucent cover 15 is a cover made of translucent resin such as polymethyl methacrylate (PMMA). A peripheral edge of the translucent cover 15 is formed with a cover mask part 15a printed in black. The cover mask part 15a inhibits sunlight from entering into the case 11.

The lower case 30 is a case made of a resin such as polypropylene (PP). In the lower case 30, a container 31 for containing the display unit 20, an attachment part 32 for attaching the plane mirror 13, and an attachment part 33 for attaching the concave mirror 14 are formed.

The upper case 40 is a case made of a mixed resin such as polycarbonate and polyethylene terephthalate (PET). At an upper end of the upper case 40, an opening part 41 covered with the translucent cover 15 is provided. The upper case 40 is formed with a light shielding part 42 for shielding the sunlight toward the display unit 20 by blocking a part of the opening part 41. With this light shielding part 42, it is possible to prevent a phenomenon (washout phenomenon) where the virtual image cannot be viewed easily as a result of the sunlight entering the display unit 20 that outputs the display light L.

A perpendicular wall part 43 is extended downwardly from a front right end of the light shielding part 42. Further, the perpendicular wall part 43 extends in a substantially vertical direction. A boundary part 44 between the light shielding part 42 and the perpendicular wall part 43 is set to have a predetermined surface roughness of about 20 μm, by sandblasting or the like, to suppress the reflection of the sunlight.

Further, at a right end of the light shielding part 42, a perpendicular wall part 45 configuring a side wall of the upper case 40 extends toward a perpendicular direction. The perpendicular wall part 45 extends in a substantially vertical direction. Similarly to the boundary part 44, a boundary part 46 between the light shielding part 42 and the perpendicular wall part 45 is set to have a predetermined surface roughness.

The light shielding part 42 is in a curved shape with a continuously varying curvature. A top surface 42a of the light shielding part 42 is affixed with a low reflection sheet 50 that suppresses the reflection of the sunlight. The low reflection sheet 50 is a black sheet of which the surface is applied with urethane foam. It is preferable that the low reflection sheet 50 excels at heat resistance and generates less volatile gas (low outgas). An upper area at a front end of the low reflection sheet 50 is covered with the cover mask part 15a so that the inside of the case 11 cannot be viewed from outside.

Figure 3:
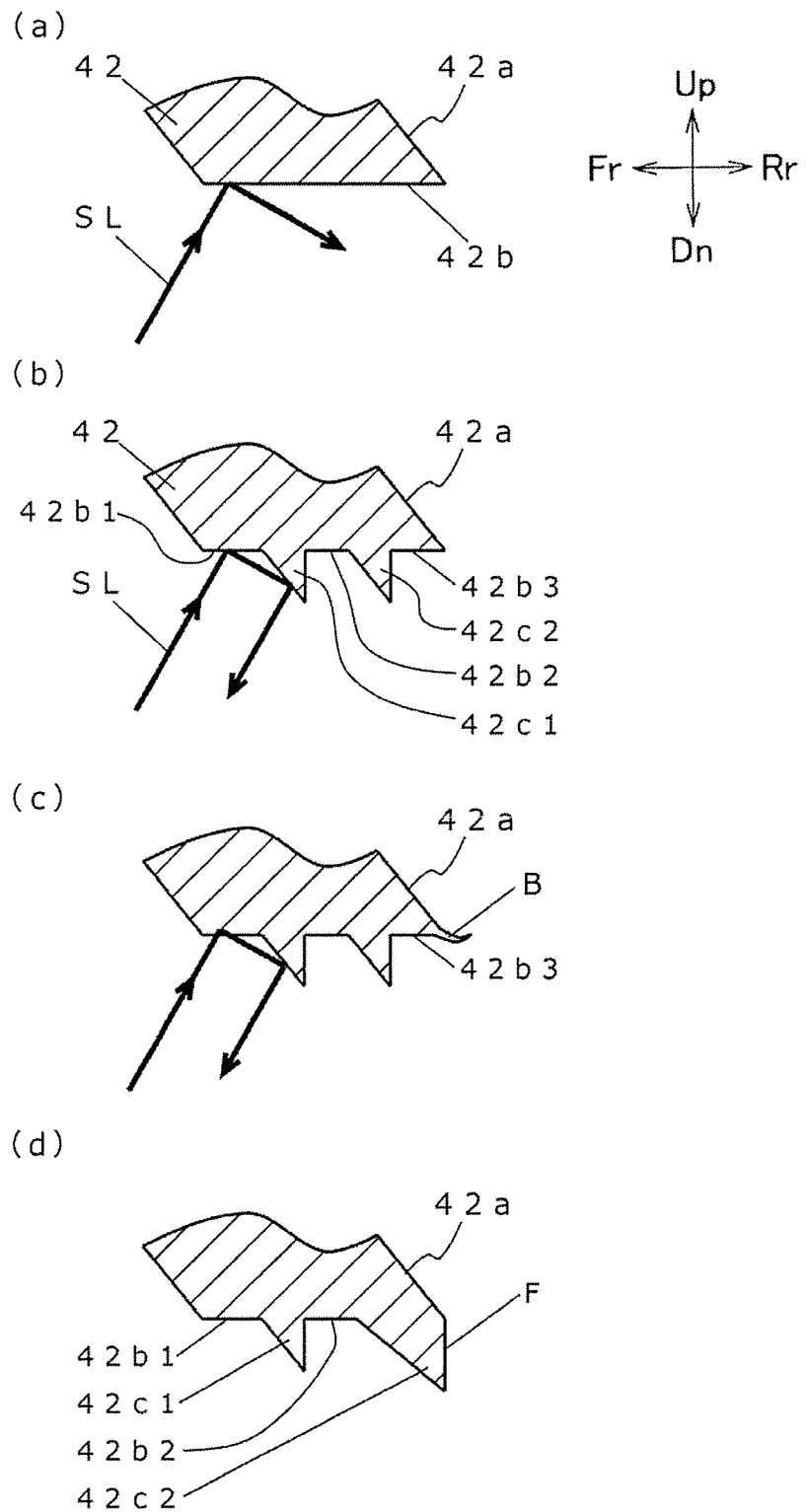
FIG. 3(a) to FIG. 3(d) are each enlarged views of a main portion A of the cross-sectional view of the head-up display device 10 taken along line 2-2.

A configuration of the light shielding part 42 for preventing a washout phenomenon will be described based on an enlarged view of a main portion A of FIG. 3.

A bottom surface 42b of the conventional light shielding part 42 is a flat surface, as illustrated in FIG. 3(a). In this case, scattered light SL of the display light L emitted from the display unit 20 may enter the concave mirror 14 after being reflected by the bottom surface 42b. Therefore, the bottom surface 42b may be illuminated to be displayed, as the virtual image, on the front windshield, and thus, a marketability of the head-up display device is impaired.

In contrast to the conventional configuration of the light shielding part 42, on the bottom surface 42b of the light shielding part 42 of the head-up display device 10, as illustrated in FIG. 3(b), a strip-shaped protrusion part 42c1 with a width of 0.5 mm and a height (in the perpendicular direction) of 0.5 mm corresponding to the bottom surface 42b1 with a width (in the front-rear direction) of 1 mm, and a strip-shaped protrusion part 42c2 with a width of 0.5 mm and a height of 0.5 mm corresponding to the bottom surface 42b2 with a width of 1 mm are arranged in a stipe shape extending along a side in a longer direction (Le-Ri direction in FIG. 1) of the bottom surface 42b. The strip-shaped protrusion part 42c1 prevents scattered light SL reflected by the bottom surface 42b1 from moving toward the concave mirror 14. Further, the strip-shaped protrusion part 42c2 prevents the scattered light SL reflected by the bottom surface 42b2 from moving toward the concave mirror 14. With the strip-shaped protrusion parts 42c1, 42c2, a possibility that the bottom surface 42 is illuminated to be displayed, as the virtual image, on the front windshield is reduced.

Further, in a configuration of the bottom surface 42b of the light shielding part 42 illustrated in FIG. 3(b), depending on a mold configuration of a resin molding, when a core is moved from a cavity of the mold, as illustrated in FIG. 3(c), a burr B may be generated at a boundary between the top surface 42a and the bottom surface 42b3. The burr B may be illuminated with the scattered light SL of the display light L and the sunlight to be displayed, as the virtual image, on the front windshield, and thus, the marketability of the head-up display device may be impaired.

Therefore, as illustrated in FIG. 3(d), it is preferable that a flat surface F of the strip-shaped protrusion part 42c2 closest to the top surface 42a side is formed continuously with the top surface 42a. With this configuration, the possibility that the burr generates is reduced.

Further, as illustrated in FIG. 3(d), it is preferable that the strip-shaped protrusion parts 42c1, 42c2 are configured to gradually increase in size as the strip-shaped protrusion parts 42c1, 42c2 are closer to the top surface 42a (farther away from the display unit 20). In this case, for example, a strip-shaped protrusion part 42c1 with a width of 0.5 mm and a height (in the perpendicular direction) of 0.5 mm corresponding to the bottom surface 42b1 with a width (in the front-rear direction) of 1 mm is arranged, and a strip-shaped protrusion part 42c2 with a width of 1.0 mm and a height of 1.0 mm corresponding to the bottom surface 42b2 with a width of 1.5 mm is arranged.

As described above, the head-up display device 10 which is one embodiment of the present invention is a head-up display device configured so that the display unit 20 for emitting the display light L is housed in the case 11 and the light shielding part 42 that blocks a part of the opening part 41 that emits the display light L is provided. In the device, the strip-shaped protrusion parts 42c1, 42c2 are formed on the bottom surface 42b of the light shielding part 42.

With this configuration, with the help of the strip-shaped protrusion parts 42c1, 42c2, it is possible to prevent a situation where the bottom surface 42b of the light shielding part 42 for preventing a washout phenomenon is illuminated with the scattered light SL of the display light L emitted from the display unit 20 and displayed as the virtual image.

The present invention is not limited to the one embodiment (including a content of the drawings). It is possible to add a modification (including omission of a composition element) to the embodiment within a range that follows a gist of the present invention.

For example, the head-up display device of the present invention can be applied to a work vehicle such as construction machinery. Further, the head-up display device of the present invention displays the virtual image by utilizing, as a projection surface, of the front windshield of the vehicle; however, in addition thereto, the head-up display may be configured to include a projection member (combiner) for projecting the display light.

Further, the light shielding part 42 of the head-up display device of the present invention is configured to be affixed with a low reflection sheet; however, in addition thereto, instead of the low reflection sheet 50, a configuration that black paint that suppresses the reflection is applied may be acceptable.

INDUSTRIAL APPLICABILITY

The present invention is suitable to a head-up display device to be mounted on a vehicle.

DESCRIPTION OF REFERENCE NUMERALS

10: Head-up display device
11: Case
20: Display unit
41: opening part
42: light shielding part
42a: Top surface (of light shielding part)
42b, 42c1, 42c2, 42c3: Bottom surface (of light shielding part)
42c1, 42c2: strip-shaped protrusion part (of light shielding part)
L: Display light

The invention claimed is:

1. A head-up display device comprising:
a display unit for emitting display light for displaying a virtual image on a windshield of a vehicle;
a case that houses the display unit, wherein the case comprises:
an opening disposed on a light path of the display light, the opening allowing a first part of the display light to travel from inside the case to outside the case; and
a light shielding part extending from the case into the opening;
a first mirror disposed on the light path of the display light; and
a second mirror disposed on the light path of the display light,
wherein the first mirror reflects the display light emitted from the display unit toward the second mirror,
wherein the second mirror reflects the display light from the first mirror toward the opening,
wherein the light shielding part comprises at least one protrusion part blocking a second part of the display light from traveling from inside the case to outside the case,
wherein the at least one protrusion part extends from the light shielding part toward inside the case, and
wherein the at least one protrusion part of the light shielding part is disposed between the first mirror and the second mirror.

2. The head-up display device according to claim 1, wherein the at least one protrusion part is disposed on a distal end of the light shielding part.

3. The head-up display device according to claim 1, wherein the at least one protrusion part includes 1) a first strip-shaped protrusion and 2) a second strip-shaped protrusion, and
wherein a size of the first strip-shaped protrusion disposed farther away from the display unit than the second strip-shaped protrusion is larger than a size of the second strip-shaped protrusion.

4. The head-up display device according to claim 2, wherein the at least one protrusion part includes 1) a first strip-shaped protrusion and 2) a second strip-shaped protrusion,
wherein the first strip-shaped protrusion is disposed on the distal end of the light shielding part so that the first strip-shaped protrusion is formed continuously from a top surface of the light shielding part, and
wherein a size of the first strip-shaped protrusion disposed farther away from the display unit than the second strip-shaped protrusion is larger than a size of the second strip-shaped protrusion.

5. A head-up display device comprising:
a display unit for emitting display light;
a case that houses the display unit, wherein the case comprises:
an opening disposed on a first light path along which a first part of the display light travels, the opening allowing the first part of the display light to travel from the display unit housed inside the case to outside the case; and
a light shielding part extending from the case into the opening;
a first mirror disposed on the light path of the display light; and
a second mirror disposed on the light path of the display light,
wherein the first mirror reflects the display light emitted from the display unit toward the second mirror,
wherein the second mirror reflects the display light from the first mirror toward the opening,
wherein the light shielding part comprises at least one protrusion part,
wherein the at least one protrusion part extends from the light shielding part toward inside the case,
wherein the at least one protrusion part is disposed on a second light path along which a second part of the display light travels from the display unit to the at least one protrusion part,
wherein the at least one protrusion part reflects the second part of the display light such that the reflected second part of the display light travels back towards the display unit, and
wherein the at least one protrusion part of the light shielding part is disposed between the first mirror and the second mirror.

6. The head-up display device according to claim 1,
wherein the case further comprises an attachment part for holding the first mirror,
wherein the first mirror is held between the attachment part and a bottom surface of the light shielding part, and
wherein the cover is disposed on a top surface of the light shielding part.

\* \* \* \* \*